(12) United States Patent
Guo et al.

(10) Patent No.: US 11,589,240 B2
(45) Date of Patent: Feb. 21, 2023

(54) SPECTRUM MANAGEMENT APPARATUS AND METHOD, WIRELESS NETWORK MANAGEMENT APPARATUS AND METHOD, AND MEDIUM

(71) Applicant: Sony Corporation, Tokyo (JP)

(72) Inventors: Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 173 days.

(21) Appl. No.: 16/964,214

(22) PCT Filed: May 5, 2019

(86) PCT No.: PCT/CN2019/085495
§ 371 (c)(1),
(2) Date: Jul. 23, 2020

(87) PCT Pub. No.: WO2019/214543
PCT Pub. Date: Nov. 14, 2019

(65) Prior Publication Data
US 2021/0044983 A1 Feb. 11, 2021

(30) Foreign Application Priority Data
May 10, 2018 (CN) .......................... 201810443092.9

(51) Int. Cl.
*H04W 16/14* (2009.01)
*H04W 24/10* (2009.01)

(52) U.S. Cl.
CPC .......... *H04W 16/14* (2013.01); *H04W 24/10* (2013.01)

(58) Field of Classification Search
CPC ..... H04W 16/14; H04W 24/10; H04W 16/18; H04W 24/02; H04W 72/04; H04W 72/08;
(Continued)

(56) References Cited

U.S. PATENT DOCUMENTS 10,925,074 B2 * 2/2021 Guo .................. G06F 16/00
2012/0157096 A1 * 6/2012 Baek .................. H04B 17/318
455/434
(Continued)

FOREIGN PATENT DOCUMENTS

CN 104640219 A 5/2015
CN 105453637 A 3/2016
(Continued)

OTHER PUBLICATIONS

International Search Report and Written Opinion dated Jul. 23, 2019 for PCT/CN2019/085495 filed on May 5, 2019, 8 pages including English Translation of the International Search Report.

*Primary Examiner* — Marcus Hammonds
(74) *Attorney, Agent, or Firm* — Xsensus LLP

(57) ABSTRACT

The present disclosure relates to a spectrum management apparatus and method, a wireless network management apparatus and method, and a medium. According to one embodiment, an electronic apparatus for spectrum management comprises a processing circuit configured to generate measurement configuration information and to conduct control to send the measurement configuration information to one or more wireless network management apparatuses. The measurement configuration information comprises a measurement mode, and the measurement mode comprises at least one of the following modes: the wireless network management apparatus managed by the electronic apparatus performing measurement, and one or more specific nodes of the wireless network management apparatus performing measurement.

14 Claims, 11 Drawing Sheets

(58) Field of Classification Search
CPC ... H04W 24/08; H04W 16/10; H04W 72/082; H04L 41/0803; H04L 43/50
See application file for complete search history.

(56) References Cited

U.S. PATENT DOCUMENTS

| | | | |
|---|---|---|---|
| 2014/0092771 A1* | 4/2014 | Siomina | H04W 24/08 370/252 |
| 2016/0182198 A1* | 6/2016 | Won | H04L 5/0035 370/329 |
| 2017/0078889 A1* | 3/2017 | Sun | H04W 16/10 |
| 2019/0104489 A1* | 4/2019 | Huang | H04W 16/14 |

FOREIGN PATENT DOCUMENTS

| | | |
|---|---|---|
| CN | 106454856 A | 2/2017 |
| CN | 106937294 A | 7/2017 |
| EP | 3051860 A1 | 8/2016 |

* cited by examiner (a)

(b)

(a)

(b)

Newly added node

SPECTRUM MANAGEMENT APPARATUS AND METHOD, WIRELESS NETWORK MANAGEMENT APPARATUS AND METHOD, AND MEDIUM

CROSS-REFERENCE TO RELATED APPLICATIONS

The present application is based on PCT filing PCT/CN2019/085495, filed May 5, 2019, which claims priority to CN 201810443092.9, filed May 10, 2018, the entire contents of each are incorporated herein by reference.

FIELD

The present disclosure relates to the technical field of wireless communications, and in particular to an electronic device for spectrum management, a spectrum management method, a wireless network management device, a wireless network management method, and a computer-readable medium.

BACKGROUND

With the rapid growth of the number of wireless devices and the diversity of wireless services, the problem of spectrum scarcity is becoming more and more serious. One promising solution is to perform spectrum sharing, which enables multiple systems to share a target frequency band through coexistence and coordination, improving usage efficiency of resources. The frequency band currently opened for sharing is referred to as an unlicensed frequency band, which includes, for example, 3.5 GHz, 5 GHz, and 6 GHz.

Graph theory has a natural advantage for the systematic representation of network information no matter in physical structure or logical structure. The numerous models and algorithms accumulated in the research of graph theory provide effective solutions for the allocation of network resources, which are currently highly valued by industries. In more and more standards, the method of constructing a network graph model and performing resource allocation based on the model is adopted, for example, the Spectrum Access System (SAS) developed by the Wireless Innovation Forum (WINNF) organization, which studies coexistence management between multiple systems in the 3.5 GHz frequency band, and the Broadband Radio Access Networks (BRAN) project initiated by the European Commission, which studies central collaboration of wireless access systems/wireless local area networks (WAS/RLAN) in the 5 GHz band.

SUMMARY

The graph has numerous topological structures, and different topological structures have different characteristics. A tiny topological change may cause an extreme difference in the result of resource allocation based on graph theory, resulting in an unstable result of resource allocation, thus affecting the scalability of the network. That is, for any changes, it is required to reconstruct the graph, recalculate the spectrum allocation, and then notify all network nodes to perform reconfiguration. Especially when the period of resource allocation is long, if the resource allocation is performed only based on the instantaneous topological structure of the network, the demand on state change of the network within a long time interval cannot be satisfied.

In view of at least a part of the above questions, the present disclosure is provided.

A brief overview of embodiments of the present disclosure is given below in order to provide a basic understanding of certain aspects of the present disclosure. It should be understood that the following summary is not an exhaustive summary of the present disclosure. It is not intended to determine the key or important part of the present disclosure, nor is it intended to limit the scope of the present disclosure. Its purpose is only to present some concepts in a simplified form as a prelude to a more detailed description later.

According to an embodiment, an electronic device for spectrum management is provided, which includes processing circuitry configured to: generate measurement configuration information and perform control to transmit the measurement configuration information to one or more wireless network management devices. The measurement configuration information includes a measurement manner including at least one of the following manners: a wireless network management device managed by the electronic device performs measurement, and one or more specific nodes of the wireless network management device perform measurement.

According to another embodiment, a spectrum management method is provided, which includes: generating measurement configuration information and transmitting the measurement configuration information to one or more wireless network management devices. The measurement configuration information includes a measurement manner including at least one of the following manners: a wireless network management device managed by the electronic device performs measurement, and one or more specific nodes of the wireless network management device perform measurement.

According to yet another embodiment, a wireless network management device is provided, which includes processing circuitry configured to perform control to receive measurement configuration information from a spectrum management device. The measurement configuration information includes a measurement manner including at least one of the following manners: the wireless network management device performs measurement, and one or more specific nodes of the wireless network management device perform measurement. The processing circuitry is further configured to control a measurement based on the measurement manner.

According to yet another embodiment, a wireless network management method is provided, which includes a step of receiving measurement configuration information from a spectrum management device. The measurement configuration information includes a measurement manner including at least one of the following manners: a wireless network management device performs measurement, and one or more specific nodes of the wireless network management device perform measurement. The wireless network management method further includes a step of controlling a measurement based on the measurement manner.

A computer readable medium is further provided according to an embodiment of the present disclosure, which includes executable instructions. The executable instructions, when executed by an information processing apparatus, cause the information processing apparatus to execute the method according to the embodiments of the present disclosure.

With the embodiments of the present disclosure, it is beneficial to improve the stability of the result of resource allocation and the scalability of a network.

BRIEF DESCRIPTION OF THE DRAWINGS

The present disclosure may be better understood with reference to the description given below in conjunction with the drawings, in which the same or similar reference numerals are used to denote the same or similar components in all the drawings. The drawings are included in this specification together with the following detailed description and form a part of this specification, and are used to further illustrate preferred embodiments of the present disclosure and explain the principles and advantages of the present disclosure. In the drawings.

DETAILED DESCRIPTION OF EMBODIMENTS

Embodiments of the present disclosure will be described below with reference to the drawings. Elements and features described in one drawing or one embodiment of the present disclosure may be combined with elements and features shown in one or more other drawings or embodiments. It should be noted that, for the purpose of clarity, representations and descriptions of components and processes that are irrelevant to the present disclosure and known to those skilled in the art are omitted from the drawings and the description.

Figure 1:
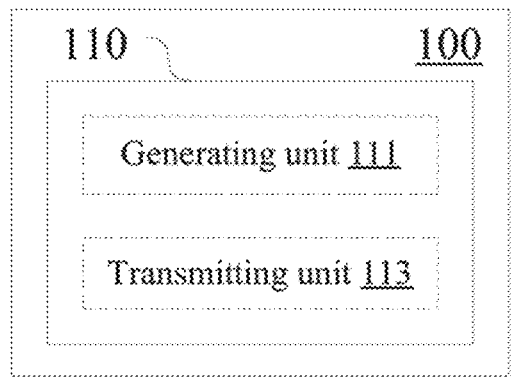
FIG. 1 is a block diagram showing a configuration example of an electronic device for spectrum management according to an embodiment of the present disclosure.

As shown in FIG. 1, the electronic device 100 for spectrum management according to an embodiment includes a processing circuit 110. The processing circuit 110 may be implemented as a specific chip, a chipset, a central processing unit (CPU), or the like, for example.

The processing circuit 110 includes a generating unit 111 and a transmitting unit 113. It should be noted that although the generating unit 111 and the transmitting unit 113 are shown in the form of functional blocks in FIG. 1, it should be understood that the functions of the units may also be implemented by the processing circuit 110 as a whole, and not necessarily implemented by separately actual components in the processing circuit 110. In addition, although the processing circuit 110 is shown as one box in FIG. 1, the electronic device 100 may include multiple processing circuits, and the functions of the generating unit 111 and the transmitting unit 113 may be distributed to the multiple processing circuits, such that these functions can be performed by cooperation operation of the multiple processing circuits.

The generating unit 111 is configured to generate measurement configuration information. The measurement configuration information may include a measurement manner, and the measurement manner may include: a wireless network management device managed by the electronic device performs measurement, or one or more specific nodes of the wireless network management device perform measurement.

More specifically, the specific node may include, for example, a user equipment (UE) or a node dedicated to perform measurement (which may be referred to as a dedicated node hereinafter).

In addition, according to an embodiment, the measurement configuration information may further include measurement object information. For example, the measurement object information may include information related to a working mode of the wireless network management device, and information related to a mode of interference from a neighboring wireless network on the wireless network management device.

More specifically, the information related to the working mode may include, for example, an accumulated working duration of the wireless network management device within a predetermined period of time, a distribution of continuous working duration or continuous idle duration of the wireless network management device within a predetermined period of time, and the like. The information related to the mode of interference may include, for example, a distribution of interference from the neighboring wireless network on the wireless network management device within a predetermined period of time.

The transmitting unit 113 is configured to perform control to transmit the measurement configuration information generated by the generating unit 111 to one or more wireless network management devices.

The electronic device 100 according to an embodiment may be applied to the Citizen Broadband Wireless Service (CBRS) on the 3.5 GHz frequency band, and the electronic device 100 may be configured on a side of a spectrum access system (SAS) or coexistence manager (CxM), and the wireless network management device includes a Civilian Broadband Radio Service Device (CBSD).

The electronic device 100 according to another embodiment may be applied to a 5 GHz broadband system, the electronic device 100 may be configured on a side of a C3 Instance, and the wireless network management device may include a wireless access system (WAS) or a wireless local area network (RLAN).

Although the present disclosure is described by taking the 3.5 GHz and 5 GHz as an example, the present disclosure is not limited thereto, and the present disclosure is also applicable to other unlicensed frequency bands. In addition, in the embodiments of the present disclosure, the use of the unlicensed spectrum satisfies usage requirements on the corresponding unlicensed spectrum, such as a protection of an incumbent user on the frequency band or a protection of a higher-priority user.

Figure 2:
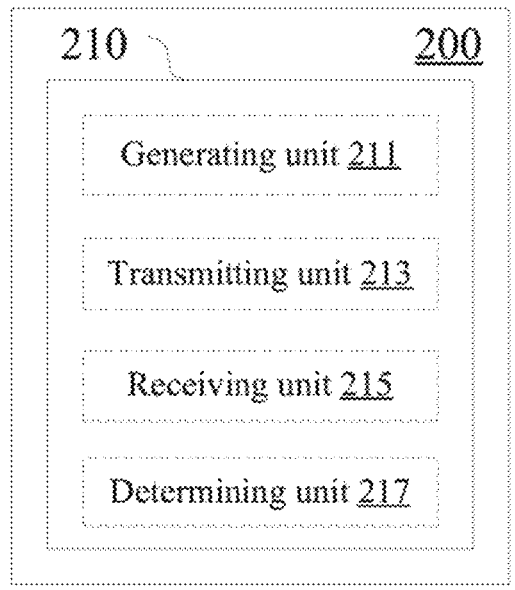
FIG. 2 is a block diagram showing a configuration example of an electronic device for spectrum management according to another embodiment.

FIG. 2 shows a configuration example of an electronic device for spectrum management according to an embodiment. The electronic device 200 includes a processing circuit 210, the processing circuit includes a generating unit 211, a transmitting unit 213, a receiving unit 215, and a determining unit 217. The generating unit 211 and the transmitting unit 213 are similar to the generating unit 111 and the transmitting unit 113 described above with reference to FIG. 1.

The receiving unit 215 is configured to perform control to receive a measurement result from the one or more wireless network management devices, for determining resource allocation to the wireless network management device. Here, the resource allocation may include initial configuration or reallocation of resources.

The determination unit 217 is configured to determine, based on a measurement result related to multiple wireless network management devices, a distribution of a statistical result of interferences from a neighboring wireless network on the multiple wireless network management devices.

According to an embodiment, the determining unit 217 is further configured to determine a type of a topological structure of the multiple wireless network management devices based on the distribution of the statistical result, and determine the resource allocation based on the determined type of the topological structure.

Next, an example process of a measurement on a statistical network topology according to an embodiment of the present disclosure is described with reference to specific examples. The process may include: the spectrum management device (SM) sets a first measurement configuration for the wireless network management device (WNM), and transmits the first measurement configuration to the WNM; and the WNM receives the first measurement configuration and analyzes a measurement requirement to determine whether a second measurement is required.

If a second measurement is required, a second measurement configuration is set for a UE and/or a dedicated node and transmitted to the UE and/or the dedicated node. If the second measurement is not required, the WNM may perform corresponding measurement based on the first measurement configuration and report a measurement result to the SM.

In addition, in the case where the second measurement is required, the UE or the dedicated node may perform corresponding measurement based on the second measurement configuration and report a second measurement result to the WNM, and then the WNM processes the received second measurement result to form the first measurement result, and report the result to the SM based on the first measurement configuration.

Next, the first measurement is described in more detail.

Figure 6:
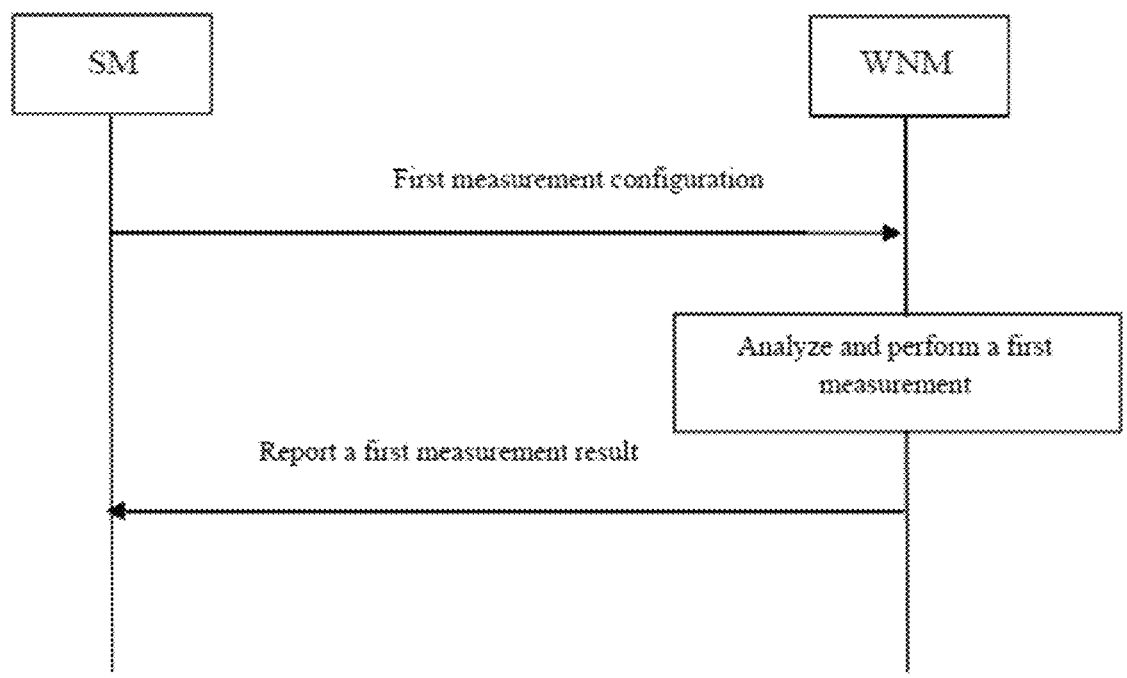
FIG. 6 shows a signaling flow related to a first measurement.

The first measurement configuration may be generated by the SM and transmitted to the WNM, and the WNM analyzes and measures the first measurement configuration, and reports a result. The WNM is usually an access node of the wireless network where the WNM is located (for example, an eNB, gNB of a cellular communication network, or an access point (AP) of WiFi). The signaling flow related to the first measurement is as shown in FIG. 6.

Measurement objects may include a working mode of a wireless network and a mode of interference from a neighboring wireless network.

The working mode of the wireless network may include an accumulated working duration of the wireless network, for example, the accumulated working duration of the wireless network in a given time window. Alternatively, the working mode of the wireless network may include a distribution of a continuous working duration (or a continuous idle duration) of the wireless network, for example, a mean value and variance of the continuous working duration (or the continuous idle duration) in a given time window.

The mode of interference from a neighboring wireless network may include a distribution of interference received by the wireless network from the neighboring wireless network in a given time window, for example, a mean value and variance of the signal reception strength. In addition, the mode of interference may include a list of IDs of neighboring wireless networks. Furthermore, a measurement manner of the distribution can also be included, such as a WNM measurement result (which is referred to as a measurement manner 1), a measurement result of nodes evenly distributed within a range of the wireless network (which is referred to as a measurement manner 2), a measurement result of nodes at an edge region covered by the wireless network and the neighboring wireless network (which is referred to as a measurement manner 3).

In addition, the measurement report may be performed, for example, in the following manner:

periodically submit the measurement result to the SM, where a reporting period of each wireless network may be determined by the SM, for example, the period may be in units of hours or days;

performing a measurement report only in a case of receiving a measurement request from the SM; or performing a measurement report only in a case that a trigger event occurs or is detected by the wireless network, where the trigger event may include, for example, that a result of the measurement object is within a range defined by the event, or that a quantization level of the result of the measurement object changes.

Next, an example manner of measurement is described. According to the measurement configuration, the working time may be accumulated within a specified time window to obtain the accumulated working duration of the wireless network. According to the measurement configuration, parameters of a continuous working duration (or a continuous idle duration) may be counted within the specified time window, and then a distribution of the duration is calculated, which includes the mean value and variance, for example, to determine a distribution of the continuous working duration (or continuous idle duration) of the wireless network. According to the measurement configuration, the signal strength (RSRP) of the neighboring wireless network may be measured within a specified time window, and a distribution of the signal strength may be calculated after measurement, which includes the mean value and variance, for example, to determine the mode of interference from the neighboring wireless network.

Next, an example of a triggering manner of the measurement report is described. According to a report configuration, the measurement report is triggered in a corresponding manner. The WNM reports required information to the SM based on the first measurement configuration.

The reported measurement result may be a measurement sample or a distribution obtained by fitting based on the measurement sample (for example, including the mean value and variance). Which kind of measurement results are used for reporting is determined depending on an indication in the measurement configuration. The SM may consider factors such as information interaction overhead and information use purpose when setting the indication in the measurement configuration. For example, the overhead required to report distribution information is smaller compared to that required to report the sample. In addition, in the case that the measurement result is used to analyze characteristics of the network topology to determine the type of resource allocation, the distribution information is sufficient for the description of characteristics of the network topology, thus it is unnecessary to report the sample information.

Figure 7:
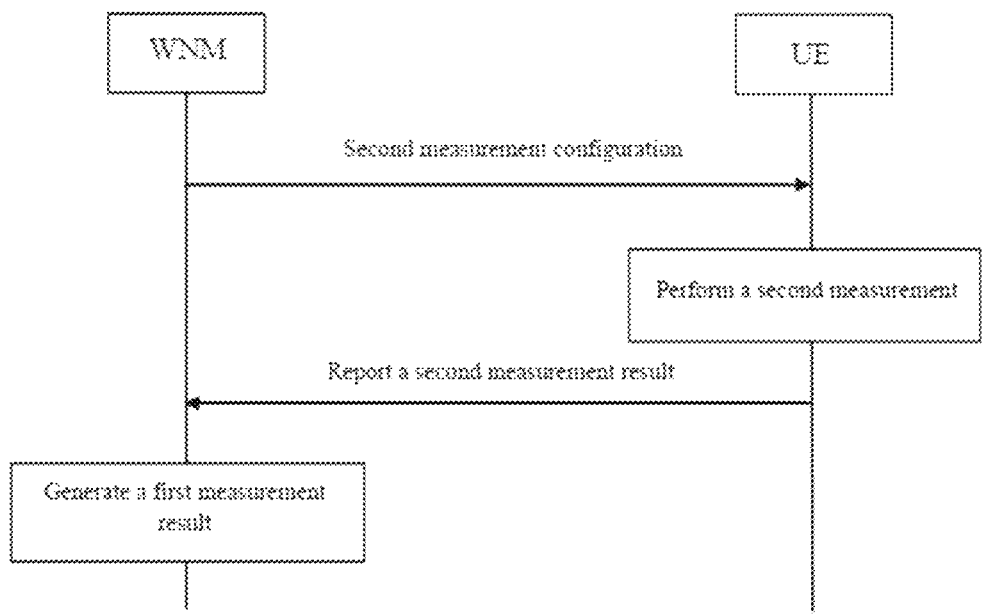
FIG. 7 shows a signaling flow related to a second measurement.

After receiving the first measurement configuration, the WNM analyses the first measurement configuration to determine whether the second measurement is required. The node performing the measurement may include one of the following situations 1 to 3. In the situation 1, the WNM performs the measurement. In the situation 2, the UE performs the measurement. In this case, the WNM is required to set a second measurement configuration for the UE and transmit the second measurement configuration to the UE. The process is as shown in FIG. 7. In the situation 3, the measurement is performed by a dedicated node. In this case, the WNM is required to set a second measurement configuration for the dedicated node and transmit the second measurement configuration to the dedicated node.

The WNM determines whether the second measurement is required based on the measurement object and the measurement manner in the first measurement configuration, and a measurement capability of a network node (WNM, UE, and/or a dedicated node).

In a case that the measurement object is the working mode of the wireless network, corresponding information may be obtained by the WNM without performing the second measurement. In a case that the measurement object is the mode of interference from the neighboring wireless network, if the measurement configuration includes the measurement manner, the measurement is performed based on the measurement manner. For example, in the above measurement manner 1 (the result is measured by the WNM), the WNM performs the measurement, such that the second measurement is not required. In the above measurement manner 2 (the result is measured by nodes evenly distributed within a range of the wireless network) and measurement manner 3 (the result is measured by nodes at the edge region covered by the wireless network and the neighboring wireless network), the second measurement is required. If the UE has the measurement capability, the measurement is performed by the UE, and if the UE does not have the measurement capability (including busy services) and is equipped with a dedicated measurement node, the measurement may be performed by the dedicated node.

For the above situation 1, the WNM performs corresponding measurement based on the first measurement configuration and reports a result to the SM.

For the situation 2 and the situation 3, the UE or the dedicated node performs corresponding measurement based on the second measurement configuration and reports a second measurement result to the WNM, and the WNM processes the received second measurement result to form a first measurement result, and report the first measurement result to the SM based on the first measurement configuration.

Figure 8:
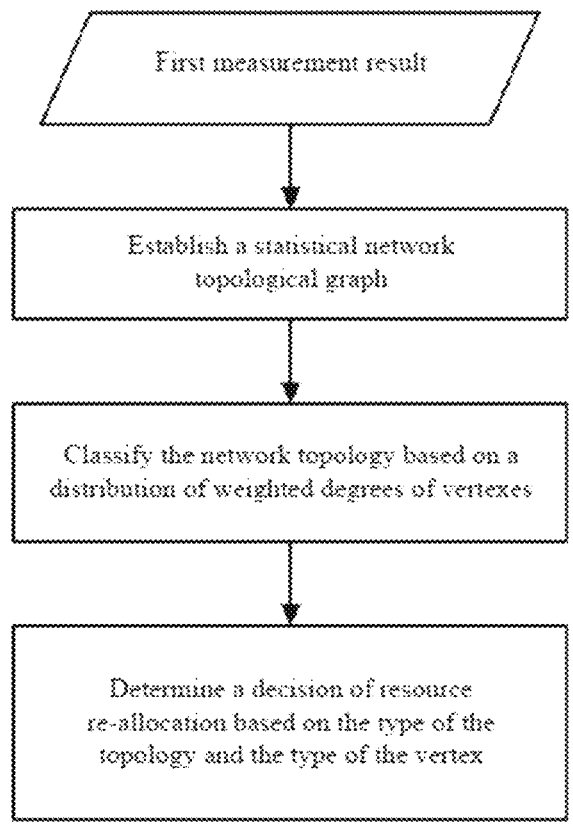
FIG. 8 shows a process example of determining a resource reallocation decision.

Next, the fitting and classification of the statistical network topological graph (G) and resource allocation are described in conjunction with the embodiments. This process is as shown in FIG. 8, and the spectrum allocating device SM generates a statistical network topological graph based on the received first measurement result, and classifies the topological graph by fitting. The spectrum allocating device allocates a manner of deciding of resource reallocation caused by changes of the wireless network based on the classification.

With continued reference to FIG. 2, according to an embodiment, the determining unit 217 is further configured to generate a topological graph of multiple wireless network management devices based on the measurement result. In the topological graph, the wireless network management devices correspond to vertexes of the topological graph, interferences between the wireless network management devices correspond to sides of the topological graph.

The wireless network management device satisfying the following conditions may be determined as the vertexes of the topological graph: an accumulated working duration exceeds a preset threshold; and/or a ratio of an accumulated working duration to an average continuous working duration exceeds a preset threshold.

In addition, the sides of the topological graph may be determined based on the following conditions: two wireless network management devices connected by the side satisfy a condition of being vertexes of the topological graph; and a mean value of signal intensity measured at at least one of the two wireless network management devices from the other exceeds a preset threshold.

According to an embodiment, the determining unit 217 may be further configured to determine a weight of the side by: with respect to an undirected graph, determining the weight based on at least one of the following manners: a larger value, a smaller value, a mean value, a weighted sum of mean values of interference intensity in two directions; with respect to a directed graph, determining, for each direction, a corresponding weight based on a mean value of interference intensity in the direction. The weight of the side may be specifically the interference intensity measurement result or a corresponding quantization level.

Further, the determining unit 217 may determine a type of a topological structure based on weighted degree of the vertexes of the topological graph. The weighted degree is a sum of weights of sides connected to a corresponding vertex.

Next, an example manner of fitting and classifying statistical network topological graph is described by taking the situation 1 and the situation 2 described in the above example as an example. The difference between the situation 3 and the situation 2 is that the measurement node is a dedicated node, rather than an ordinary UE.

An example manner of generating a statistical network topological graph is described in the following.

According to the working mode of the wireless network in the measurement result, the vertexes in the statistical network topological graph are determined. The requirements on the wireless network being a vertex include, for example: the working duration exceeds a certain preset threshold, which means that the working duration is long enough, and the duration of interaction with other surrounding wireless networks is long; the ratio of the working duration and the distribution mean value exceeds a certain preset threshold, which means that services appear frequently, and the duration of interaction with other surrounding wireless networks is long. Based on the mode of interference from a neighboring wireless network in the measurement result, the sides and the weights of the sides in the statistical network topological graph are determined.

The requirements for determining as the sides in the topological graph include, for example: both wireless networks are the vertexes of the network topological graph; a mean value of signal intensity measured at at least one of the two wireless network management devices from the other exceeds a preset threshold. The weight of the side is determined by: with respect to an undirected graph, determining the weight based on at least one of the following manners: a larger value, a smaller value, a mean value, a weighted sum of mean values of interference intensity in two directions; with respect to a directed graph, representing, for each direction, a mean value of interference intensity in the direction. In addition, the weight of the side may be a measurement result of the interference intensity, or may be a corresponding quantization level.

An example manner of fitting and classifying the statistical network topological graph is described in the following.

A distribution of key parameters of the statistical network topological graph is fitted. These key parameters include, for example, a degree of a vertex, a path length between vertexes, a clustering coefficient of connectivity of the graph, and the like.

The weighted degrees of the vertexes are described as an example in the following. The degree of a vertex in the graph is the number of sides connected to the vertex. In some embodiments, the weighted degree of vertex is the sum of the weights of the sides connected to the vertex. In the topological graph defined in the embodiment of the present disclosure, a physical meaning of the weighted degree is aggregation interference to the wireless network corresponding to the vertex. The aggregation interference is a statistical result of interference received by the wireless network from other wireless networks connected to the wireless network by the side in the topological network assuming that the wireless network and the other wireless networks perform transmission simultaneously by using the same spectrum resource, The statistical result may be, for example, the sum of interference strengths.

There are many types of topologies of the graph, including, for example, a random network and a scale-free network.

Figure 9:
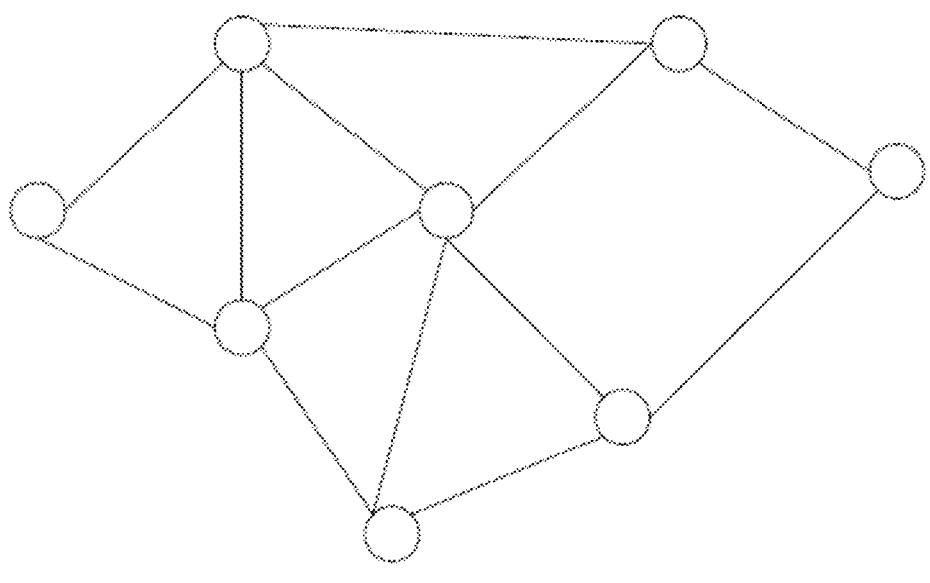
FIG. 9 is a schematic diagram for explaining a type of a topological graph.
Figure 9:
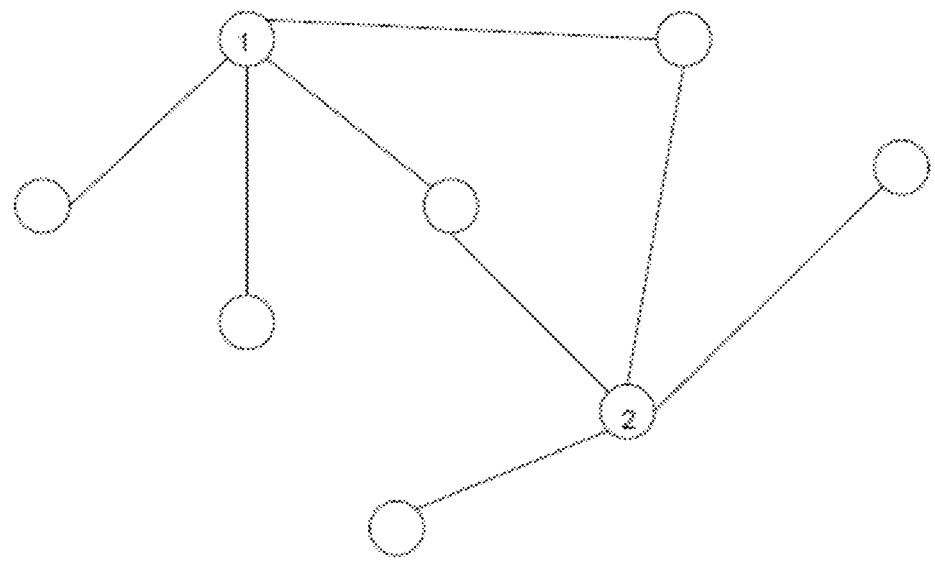

The distribution of degrees of vertexes in a random network conforms to the Poisson distribution. The degrees are mainly distributed around the mean value, and the probability of a larger or a smaller degree is exponentially decaying, as shown in (a) of FIG. 9. In FIG. 9, the circular vertex corresponds to the wireless network, and the side between the vertexes indicates that there is interference between the wireless networks corresponding to the vertexes. Assuming that the weight of each side is 1, and the weighted degree of the vertex is used as a degree of the vertex.

The distribution of degrees of vertexes in a scale-free network conforms to a power-exponential distribution, and the probability of a vertex with a degree j is $P(j)=j^{(-a)}$, where $j>0$, $a>0$, a is referred to as a scale-free exponent, as shown in (b) of FIG. 9. It can be seen from FIG. 9 that vertexes 1 and 2 have much higher degrees than other vertexes, and such nodes are referred to as hub points.

As an example, the above two distributions may be fitted by using weighted degree of the vertexes to determine the type of the corresponding topology with an optimum result.

Next, an example embodiment of performing resource allocation based on the type of the network topology is described.

According to an embodiment, the determining unit 217 may be further configured to determine, based on the determined type of the topological structure and a type of a vertex, a manner of resource re-allocation caused by a change in a wireless network management device corresponding to the vertex.

As described above, the types of a topology may include a random network and a scale-free network. Correspondingly, the manner of resource re-allocation may include: with respect to the random network, attempting for a local modification to perform resource allocation; with respect to the scale-free network, based on an influence degree produced by a vertex in a topological network, re-performing resource allocation for a whole structure with respect to topological change caused by a vertex with greater influence degree, and attempting for a local modification to perform resource allocation with respect to topological change caused by a vertex with smaller influence degree.

Next, the resource allocation based on the network topology classification is described in conjunction with specific examples.

Figure 10:
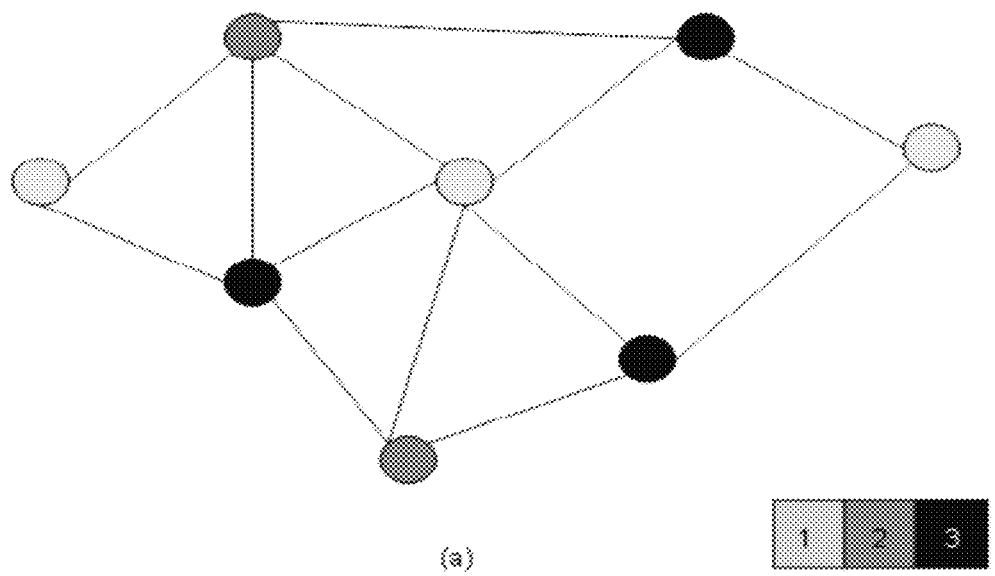
FIG. 10 is a schematic diagram of performing resource allocation based on a type of a network topology.
Figure 10:
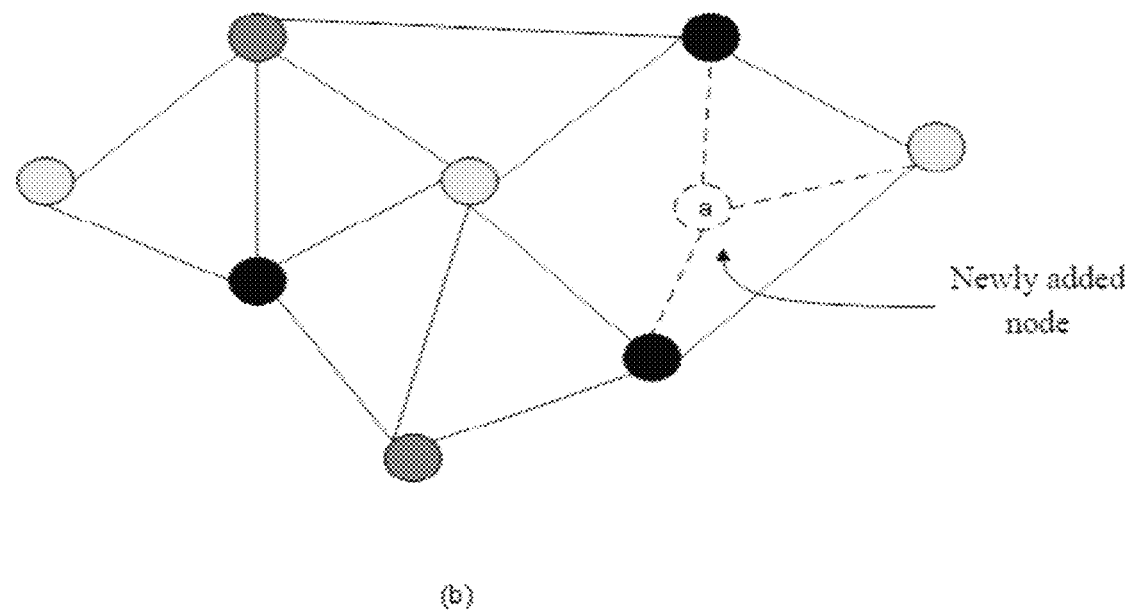

Referring to the network topological graph shown in (a) of FIG. 10, the gray levels of the vertexes correspond to different spectrums. The box represents available spectrum. For example, in FIG. 10, the spectrum is divided into three available channels, which are identified as 1, 2, and 3, respectively. Part (b) of FIG. 10 shows that a wireless network is added to the network topological graph shown in (a) of FIG. 10, corresponding to the newly added dotted vertex a, and interference between the wireless network corresponding to the vertex a and other wireless networks is as shown by a dotted line. Now, the vertex a initiates a spectrum resource request to SM, and the manner of resource re-allocation includes, for example, a complete reallocation and a partially modifying allocation.

In the complete re-allocation, that is, the SM cancels all the resource allocation results of all vertexes in the topological graph in (a) of FIG. 10, and reallocate spectrum resources for all vertexes in the topological graph in (b) of FIG. 10 based on the structure in the topological graph in (b) of FIG. 10 and the spectrum allocation constraint condition between vertexes in (b) of FIG. 10 is satisfied. The spectrum allocation constraint condition of the topological graph is that two vertexes connected by the side cannot be allocated with the same spectrum resource.

In the partially modifying allocation, the SM remains the resource allocation result of vertexes in the topological graph in (a) of FIG. 10, and allocates spectrum for the newly added vertex a by using the allocation result as a constraint condition. For example, if all conditions are met, the spectrum resource that can be allocated to the newly added vertex is the channel 2.

A manner of determining resource re-allocation based on random network characteristics include, for example, random network characteristics and scale-free network characteristics.

For the random network characteristics, since the influence degree generated by the vertexes in the network is almost symmetric, the removing or adding of the vertexes in the network has little effect on the overall allocation result, there is a high possibility for satisfying entire network resource allocation constraint by only the local modification of the resource allocation result. Therefore, in a random network, when removing or adding a node, the local modification allocation manner be performed first. Only when the local modification allocation manner cannot meet the spectrum requirements of all nodes, the complete re-allocation manner is considered.

For the scale-free network characteristics, since the influence degree generated by the vertexes in the network is severely asymmetric, a small number of vertexes have more opportunities to connect with other vertexes. Once these vertexes are removed or added, there may cause a greater effect on the network structure. The local modification of the resource allocation result cannot make effective use of resources, thus it is required to re-allocate resources for the new structure, to ensure the effective use of the resources. Therefore, in the scale-free network, it is required to determine whether the removed or added node is a Hub point, and the Hub point may be determined based on the weighted degree in the fitting result. If the removed or added node is a Hub point, the complete re-allocation manner is used. If the removed or added node is not a Hub point, the local modification allocation manner may be performed first, and only when the local modification allocation manner cannot meet the spectrum requirements of all nodes, the complete re-allocation manner is considered.

As described above, the embodiments of the present disclosure may be applied to a citizen broadband wireless service on a 3.5 GHz frequency band or a 5 GHz broadband system. Next, the two application examples are further described.

Example 1: CBRS of 3.5 GHz

The Spectrum Access System (SAS) developed by the WINNF organization studies the coexistence management of multiple systems in the 3.5 GHz frequency band. The 3.5 GHz frequency band in the United States has been used for the Department of Defense (DoD) radar system. The Federal Communications Commission (FCC) is currently discussing the use of this frequency band for commercial use through spectrum sharing. The sharing system is part of the SAS and includes three levels. Incumbent user represents the highest level. The incumbent user includes the above DoD radar system, a Fixed Satellite Service (FSS), and grandfathered terrestrial wireless operations for a limited time. Others are collectively referred to as Citizens Broadband Radio Service Device (CBSD). The Citizens Broadband Radio Service further includes two levels of a priority access license (PAL) and a General Authorized Access (GAA).

Figure 11:
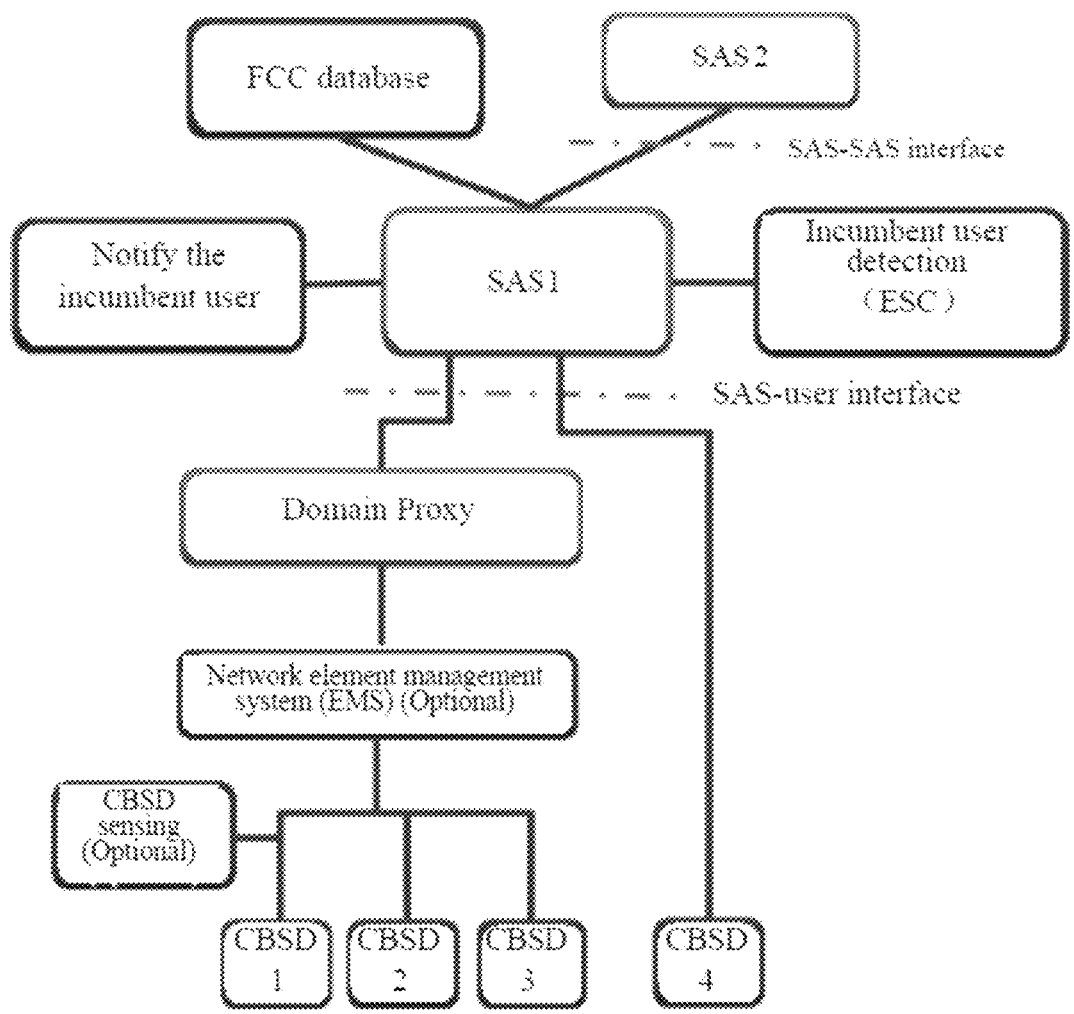
FIG. 11 shows an example of a structure of a logical entity for resource management.

In terms of spectrum usage, it is required to protect the incumbent user from harmful interference from the CBSD, and to protect the PAL from harmful interference from GAA. The CBRS performs resource allocation in units of census tracts. The PAL may use the spectrum in the range of 3550 to 3650 MHz in the units of 10 MHz units with a distribution period of three-years. The total spectrum occupied by all PALs in each census tract does not exceed 70 MHz, and the spectrum of each PAL does not exceed 40 MHz. The GAA may use the spectrum in the range of 3550 to 3700 MHz under the premise of ensuring no harmful interference to the high-level users. The logical entities used for resource management mainly include the SAS and domain proxy, as shown in FIG. 11, where the domain proxy indicates that individual CBSD or network CBSD interacts with the SAS to obtain services for CDSD. However, the CBSD may also obtain services by directly interacting with the SAS without a domain proxy.

Figure 12:
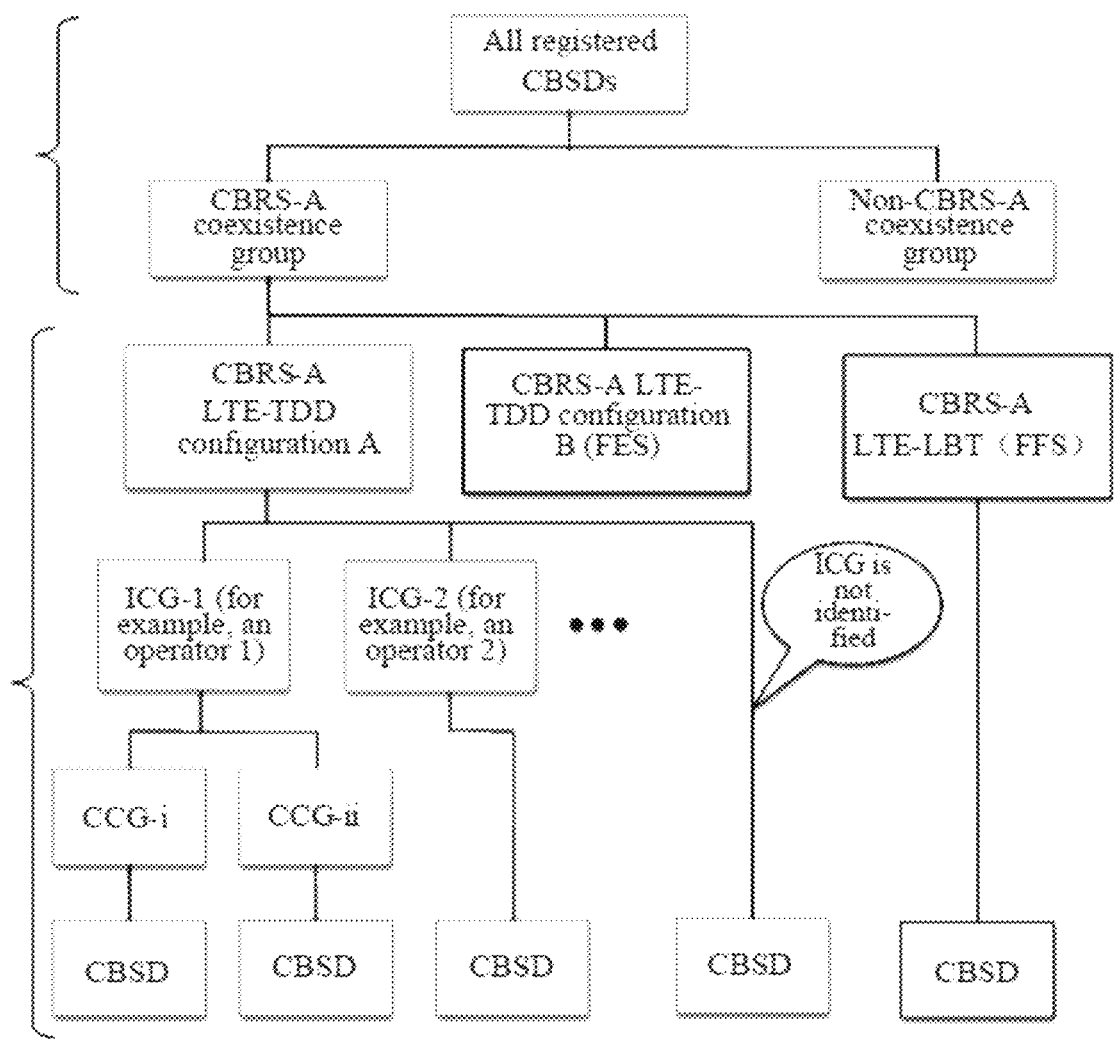
FIG. 12 shows coexistence of different citizens' broadband radio service devices (CBSD)

The CBRS Alliance (CBRS-A) organizes the formulation of technical specifications (TS) to provide coexistence between different CBSDs. The logical entity coexistence manager (CxM) in the coexistence group (CxG) managed by CBRS-A is responsible for managing the coexistence between GAA users following the rules of the SAS, as shown in FIG. 12.

In a case that the embodiment of the present disclosure is applied to a CBRS of 3.5 GHz, the spectrum allocation device SM may be SAS or CxM, the wireless network management device WNM may be CBSD, and the user equipment UE may be a terminal user equipment (EUD).

The structural configuration is, for example, that the SAS manages the CBSD and generates a first measurement configuration for the CBSD. If measurement is required, the CBSD generates a second measurement configuration for the EUD. The SAS manages the CxG and generates the first measurement configuration for the unit set in the GxG. The unit set in the GxG may include one or more CBSDs. If measurement is required, the unit set in the GxG generates a second measurement configuration for the EUD. The CxM manages the CBSD, generates a first measurement configuration for the CBSD, and the CBSD generates a second measurement configuration for the EUD. The CxM manages the CxG and generates the first measurement configuration for the unit set in the GxG. The unit set in the GxG may include one or more CBSDs. If measurement is required, the unit set in the GxG generates a second measurement configuration for the EUD.

Example 2: 5 GHz Broadband System

An object of the European Commission is to develop technologies for 5G broadband systems. The research achievements include Broadband Wireless Access Network (BRAN) project: central collaboration of WAS/RLAN in the 5 GHz frequency band.

The logical entity used for management in this system is a Central Controller and Coordinator (C3), and a physical entity thereof is a C3 Instance. The C3 Instance may be implemented as multiple C3 Instances that are distributed and interconnected, and the central coordination of the management objects is realized through information interaction.

The management object in this system is referred to as WAS/RLAN.

When the embodiment of the present disclosure is applied to a 5G broadband system, the spectrum allocation device SM may be a C3 Instance, the wireless network management device WNM may be WAS/RLANs, and the user equipment UE may be a subscriber of the WAS/RLANs.

In the above description of the embodiments of the device, it is apparent that some processes and methods are also disclosed. Next, the spectrum management method according to the embodiment is described without repeating the details described above.

Figure 3:
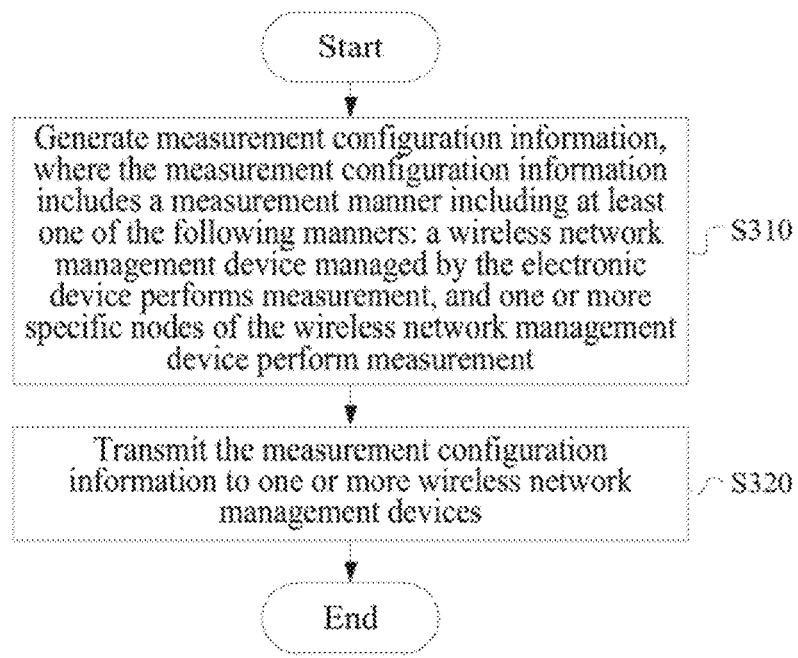
FIG. 3 is a flowchart showing a process example of a spectrum management method according to an embodiment of the present disclosure.

As shown in FIG. 3, the spectrum management method includes step S310 of generating measurement configuration information. The measurement configuration information includes a measurement manner, and the measurement manner includes at least one of the following manners: a wireless network management device managed by the electronic device performs measurement, and one or more specific nodes of the wireless network management device perform measurement.

The spectrum management method further includes step S320 of transmitting the measurement configuration information to one or more wireless network management devices.

In addition, a wireless network management device is further provided according to an embodiment of the present disclosure.

Figure 4:
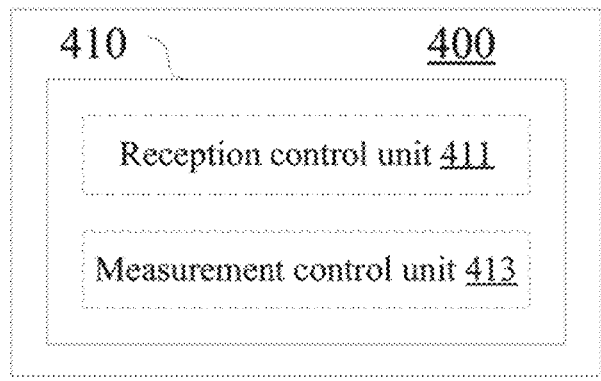
FIG. 4 is a block diagram showing a configuration example of a wireless network management device according to an embodiment of the present disclosure.

As shown in FIG. 4, the wireless network management device 400 includes a processing circuit 410. The processing circuit 410 includes a reception control unit 411 and a measurement control unit 413.

The reception control unit 411 is configured to perform control to receive, from a spectrum management device, measurement configuration information. The measurement configuration information includes a measurement manner, and the measurement manner includes at least one of the following manners: the wireless network management device performs measurement, and one or more specific nodes of the wireless network management device perform measurement.

The measurement control unit 413 is configured to control a measurement based on the measurement manner.

Figure 5:
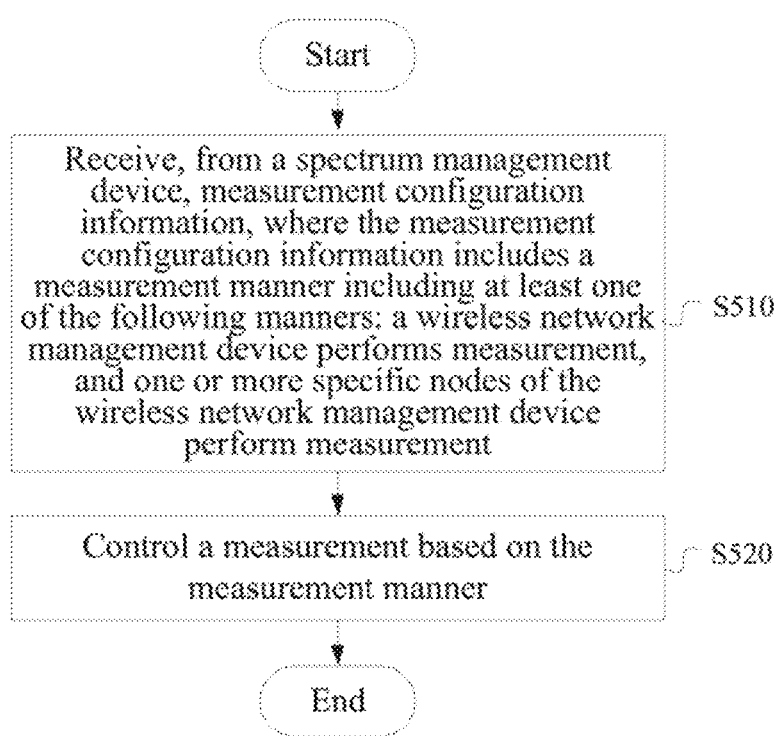
FIG. 5 is a flowchart showing a process example of a wireless network management method according to an embodiment of the present disclosure.

As shown in FIG. 5, the wireless network management method according to an embodiment includes step S510 of receiving measurement configuration information from a spectrum management device. The measurement configuration information includes a measurement manner, and the measurement manner includes at least one of the following manners: the wireless network management device performs measurement, and one or more specific nodes of the wireless network management device perform measurement.

The wireless network management method further includes step S520 of controlling a measurement based on the measurement manner.

In addition, a computer-readable medium is further provided according to an embodiment of the present disclosure, which includes executable instructions that, when executed by an information processing device, cause the information processing device to execute the wireless communication method according to the embodiment of the present disclosure.

As an example, each step of the above method and each module and/or unit of the above device may be implemented as software, firmware, hardware, or a combination thereof. In the case of implementation by software or firmware, a program that constitutes software for implementing the above method may be installed from a storage medium or network to a computer with a dedicated hardware structure (such as a general-purpose computer 1300 shown in FIG. 13), where when being installed with various programs, the computer can execute various functions.

Figure 13:
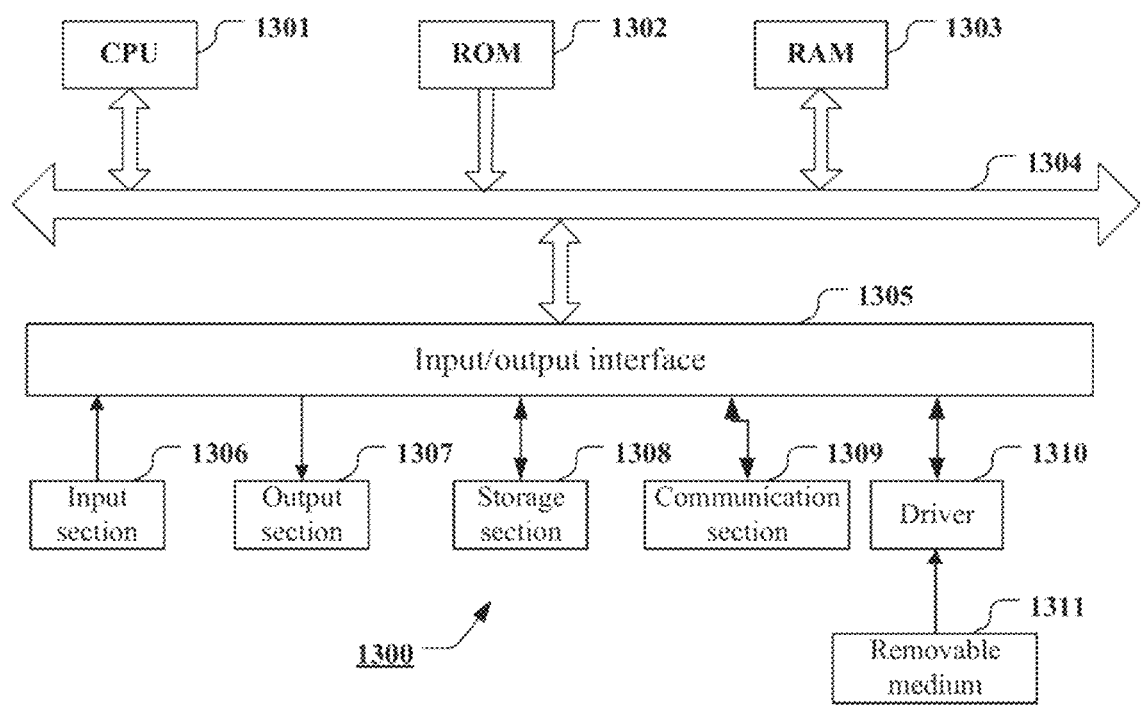
FIG. 13 is a block diagram showing an exemplary structure of a computer that implements the method and device according to the present disclosure.

In FIG. 13, an arithmetic processing unit (that is, a CPU) 1301 performs various processes according to a program stored in a read-only memory (ROM) 1302 or a program loaded from a storage section 1308 into a random access memory (RAM) 1303. In the RAM 1303, data required when the CPU 1301 performs various processes and the like are also stored as necessary. The CPU 1301, the ROM 1302, and the RAM 1303 are linked to each other via the bus 1304. The input/output interface 1305 is also linked to the bus 1304.

The following components are linked to the input/output interface 1305: an input section 1306 (including a keyboard, a mouse, and the like), an output section 1307 (including a display such as a cathode ray tube (CRT) and a liquid crystal display (LCD), and a loudspeaker, and the like), a storage section 1308 (including a hard disk, and the like), a communication section 1309 (including a network interface card such as a LAN card, a modem, and the like). The communication section 1309 performs communication processing via a network such as the Internet. The driver 1310 may also be linked to the input/output interface 1305 as needed. A removable medium 1311 such as a magnetic disk, an optical disk, a magneto-optical disk, a semiconductor memory is installed on the driver 1310 as necessary, so that the computer program read out therefrom is installed in the storage portion 1308 as necessary.

In the case where the above-described series of processing is realized by software, a program constituting the software is installed from a network such as the Internet or a storage medium such as the removable medium 1311.

Those skilled in the art should understand that such a storage medium is not limited to the removable medium 1311 shown in FIG. 13 in which a program is stored and distributed separately from a device to provide a program to a user. Examples of the removable medium 1311 include magnetic disks (including floppy disks (registered trademark)), optical disks (including compact disk read-only memory (CD-ROM) and digital versatile disk (DVD)), and magneto-optical disks (including mini disks (MD) (registered trademark)) and semiconductor memory. Alternatively, the storage medium may be a ROM 1302, a hard disk included in the storage section 1308, or the like, in which programs are stored, and distributed to users together with devices containing them.

The embodiments of the present disclosure also relate to a program product storing machine-readable instruction codes. When the instruction codes are read and executed by a machine, the above method according to the embodiment of the present disclosure may be executed.

Accordingly, a storage medium for carrying the above program product storing machine-readable instruction codes is also included in the present disclosure. The storage medium includes, but is not limited to, a floppy disk, an optical disk, a magneto-optical disk, a memory card, a memory stick, and the like.

The embodiments of the present disclosure also relate to the following electronic devices. In the case where the electronic device is used on a base station side, the electronic device may be implemented as any type of evolved Node B (eNB), such as a macro eNB and a small eNB. The small eNB may be an eNB covering a cell smaller than a macro cell, such as a pico eNB, a micro eNB, and a home (femto) eNB. Alternatively, the electronic device may be implemented as any other type of base station, such as a NodeB and a base transceiver station (BTS). The electronic device may include: a main body (which is also referred to as a base station device) configured to control wireless communications; and one or more remote wireless head ends (RRHs) arranged at different places from the main body. In addition, various types of terminals that will be described below may operate as a base station by temporarily or semi-permanently performing base station functions.

When the electronic device is used on the user equipment side, the electronic device may be implemented as a mobile terminal (such as a smart phone, tablet personal computer (PC), a notebook PC, portable game terminal, portable/dongle-type mobile router, and digital camera) or an in-vehicle terminal (such as a car navigation device). In addition, the electronic device may be a wireless communication module (such as an integrated circuit module including a single or multiple wafers) installed on each of the above terminals.

Application Example of a Terminal Device

Figure 14:
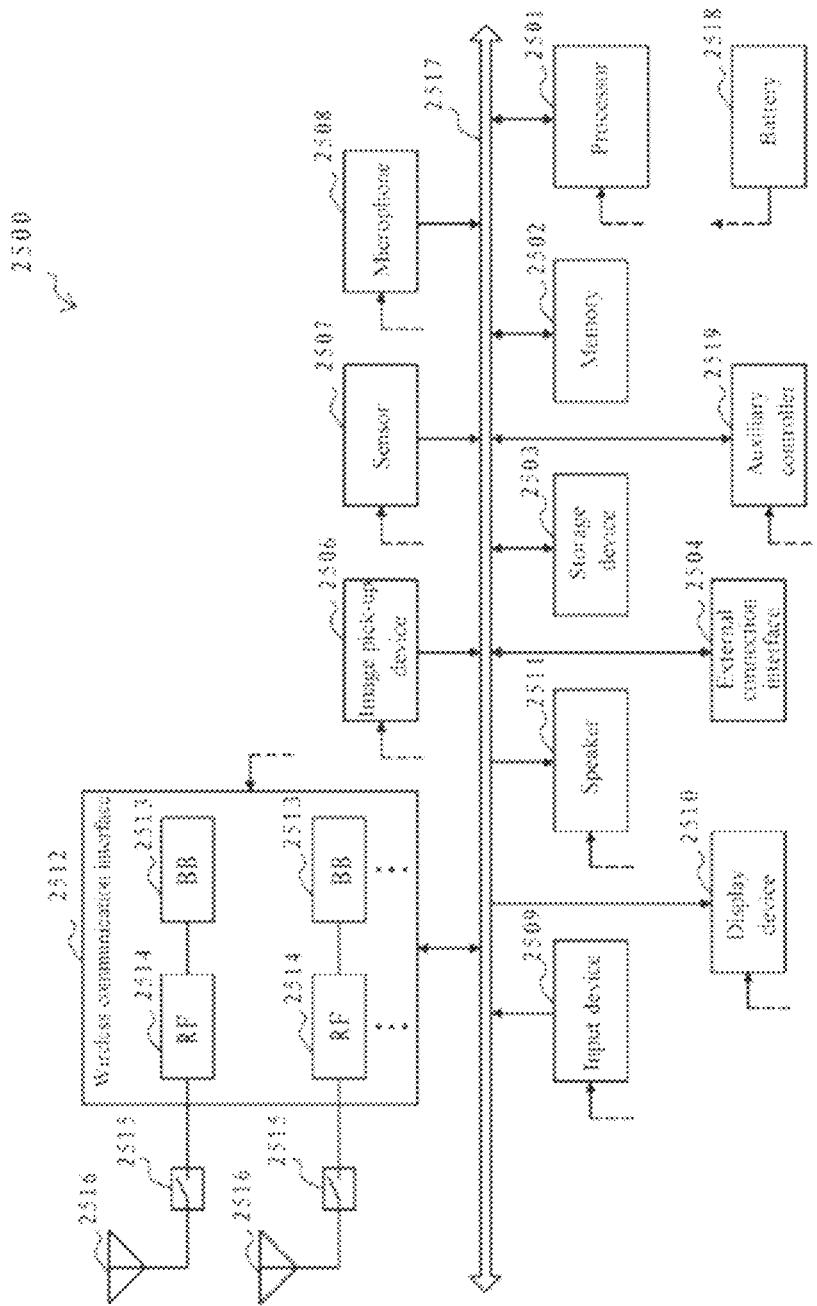
FIG. 14 is a block diagram showing an example of a schematic configuration of a smartphone to which the technology of the present disclosure may be applied.

FIG. 14 is a block diagram showing an example of a schematic configuration of a smartphone 2500 to which the technology of the present disclosure may be applied. The smartphone 2500 includes a processor 2501, a memory 2502, a storage device 2503, an external connection interface 2504, an image pick-up device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on chip (SoC), and controls functions of an application layer and another layer of the smartphone 2500. The memory 2502 includes RAM and ROM, and stores data and programs executed by the processor 2501. The storage device 2503 may include a storage medium such as a semiconductor memory and a hard disk. The external connection interface 2504 is an interface for connecting an external device (such as a memory card and a universal serial bus (USB) device) to the smartphone 2500.

The image pick-up device 2506 includes an image sensor (such as a charge coupled device (CCD) and a complementary metal oxide semiconductor (CMOS)), and generates a captured image. The sensor 2507 may include a set of sensors, such as measurement sensors, gyro sensors, geomagnetic sensors, and acceleration sensors. The microphone 2508 converts the sound inputted to the smartphone 2500 into audio signals. The input device 2509 includes, for example, a touch sensor configured to detect a touch on a screen of the display device 2510, a keypad, a keyboard, a button, or a switch, and receives operation or information inputted from the user. The display device 2510 includes a screen (such as a liquid crystal display (LCD) and an organic light emitting diode (OLED) display), and displays an output image of the smartphone 2500. The speaker 2511 converts audio signals outputted from the smartphone 2500 into sound.

The wireless communication interface 2512 supports any cellular communication scheme (such as LTE and LTE-Advanced) and performs wireless communication. The wireless communication interface 2512 may generally include, for example, a baseband (BB) processor 2513 and a radio frequency (RF) circuit 2514. The BB processor 2513 may perform, for example, encoding/decoding, modulation/demodulation, and multiplexing/demultiplexing, and perform various types of signal processing for wireless communication. In addition, the RF circuit 2514 may include, for example, a frequency mixer, a filter, and an amplifier, and transmits and receives wireless signals via the antenna 2516. The wireless communication interface 2512 may be a chip module on which the BB processor 2513 and the RF circuit 2514 are integrated. As shown in FIG. 14, the wireless communication interface 2512 may include multiple BB processors 2513 and multiple RF circuits 2514. Although FIG. 14 shows an example in which the wireless communication interface 2512 includes multiple BB processors 2513 and multiple RF circuits 2514, the wireless communication interface 2512 may also include a single BB processor 2513 or a single RF circuit 2514.

In addition to the cellular communication scheme, the wireless communication interface 2512 may support another type of wireless communication scheme, such as a short-range wireless communication scheme, a near field communication scheme, and a wireless local area network (LAN) scheme. In this case, the wireless communication interface 2512 may include a BB processor 2513 and an RF circuit 2514 for each wireless communication scheme.

Each of the antenna switches 2515 switches the connection destination of the antenna 2516 between multiple circuits (for example, circuits for different wireless communication schemes) included in the wireless communication interface 2512.

Each of the antennas 2516 includes a single or multiple antenna elements (such as multiple antenna elements included in a MIMO antenna), and is used for the wireless communication interface 2512 to transmit and receive wireless signals. As shown in FIG. 14, the smartphone 2500 may include multiple antennas 2516. Although FIG. 14 shows an example in which the smartphone 2500 includes multiple antennas 2516, the smartphone 2500 may also include a single antenna 2516.

In addition, the smartphone 2500 may include an antenna 2516 for each wireless communication scheme. In this case, the antenna switch 2515 may be omitted from the configuration of the smartphone 2500.

The bus 2517 connects the processor 2501, memory 2502, storage device 2503, the external connection interface 2504, the image pick-up device 2506, the sensor 2507, the microphone 2508, the input device 2509, the display device 2510, the speaker 2511, the wireless communication interface 2512, and the auxiliary controller 2519 to each other. The battery 2518 supplies power to each block of the smartphone 2500 shown in FIG. 14 via a feeder, which is partially shown as a dotted line in FIG. 14. The auxiliary controller 2519 operates the minimum necessary functions of the smartphone 2500 in a sleep mode, for example.

In the smartphone 2500 shown in FIG. 14, the transceiver device of the device on the user equipment side may be implemented by the wireless communication interface 2512. At least a part of the function of the processing circuit and/or each unit of the electronic device or the information processing device on the user equipment side may also be implemented by the processor 2501 or the auxiliary controller 2519. For example, the power consumption of the battery 2518 may be reduced by the auxiliary controller 2519 performing a part of the functions of the processor 2501. In addition, the processor 2501 or the auxiliary controller 2519 may execute at least a part of the functions of the processing circuit and/or each unit of the electronic device or the information processing device on the user equipment side by executing the program stored in the memory 2502 or the storage device 2503.

[Application Example of a Base Station]

Figure 15:
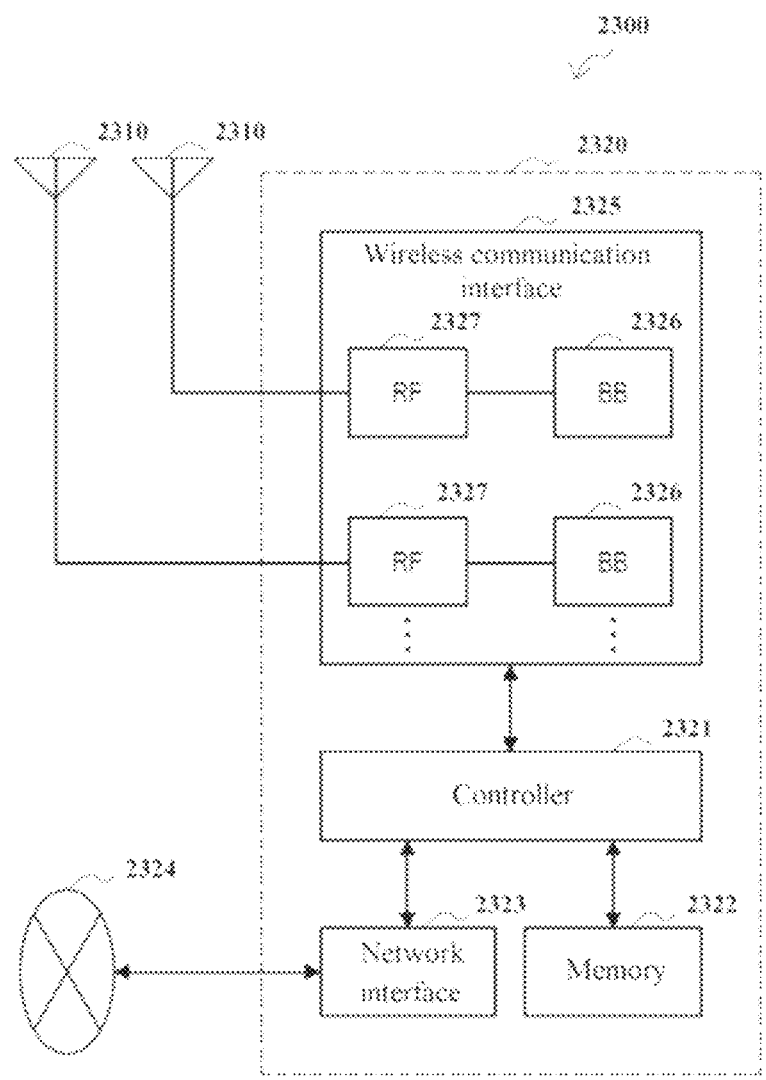
FIG. 15 is a block diagram showing an example of a schematic configuration of a gNB (a base station in a 5G system) to which the technology of the present disclosure may be applied.

FIG. 15 is a block diagram showing an example of a schematic configuration of a gNB to which the technology of the present disclosure may be applied. The gNB 2300 includes multiple antennas 2310 and a base station device 2320. The base station device 2320 and each of the antennas 2310 may be connected to each other via a radio frequency (RF) cable.

Each of the antennas 2310 includes a single or multiple antenna elements (such as multiple antenna elements included in a multiple input multiple output (MIMO) antenna), and is used for the base station device 2320 to transmit and receive wireless signals. As shown in FIG. 15, the gNB 2300 may include multiple antennas 2310. For example, the multiple antennas 2310 may be compatible with multiple frequency bands used by the gNB 2300.

The base station device 2320 includes a controller 2321, a memory 2322, a network interface 2323, and a wireless communication interface 2325.

The controller 2321 may be, for example, a CPU or a DSP, and operates various functions of higher layers of the base station device 2320. For example, the controller 2321 generates a data packet based on the data in the signal processed by the wireless communication interface 2325, and transfers the generated packet via the network interface 2323. The controller 2321 may bundle data from multiple baseband processors to generate bundle packets, and transfer the generated bundle packets. The controller 2321 may have a logical function of performing control such as radio resource control, radio bearer control, mobility management, admission control, and scheduling. The control may be performed in conjunction with nearby gNB or core network nodes. The memory 2322 includes RAM and ROM, and stores programs executed by the controller 2321 and various types of control data (such as terminal lists, transmission power data, and scheduling data).

The network interface 2323 is a communication interface for connecting the base station device 2320 to the core network 2324. The controller 2321 may communicate with the core network node or another gNB via the network interface 2323. In this case, the gNB 2300 and the core network node or other gNB may be connected to each other through logical interfaces (such as S1 interface and X2 interface). The network interface 2323 may also be a wired communication interface or a wireless communication interface for a wireless backhaul line. If the network interface 2323 is a wireless communication interface, the network interface 2323 may use a higher frequency band for wireless communication than the frequency band used by the wireless communication interface 2325.

The wireless communication interface 2325 supports any cellular communication scheme such as Long Term Evolution (LTE) and LTE-Advanced, and provides a wireless connection to terminals located in the cell of the gNB 2300 via the antenna 2310. The wireless communication interface 2325 may generally include, for example, a BB processor 2326 and an RF circuit 2327. The BB processor 2326 can perform, for example, encoding/decoding, modulation/demodulation, and multiplexing/demultiplexing, and perform various types of signal processing (such as L1, medium access control (MAC), radio link control (RLC), and packet data aggregation protocol (PDCP)) of layers. Instead of the controller 2321, the BB processor 2326 may have some or all of the above logic functions. The BB processor 2326 may be a memory storing a communication control program, or a module including a processor configured to execute the program and related circuits. The update of programs may change the function of the BB processor 2326. The module may be a card or blade inserted into the slot of the base station device 2320. Alternatively, the module may also be a chip mounted on a card or blade. In addition, the RF circuit 2327 may include, for example, a frequency mixer, a filter, and an amplifier, and transmits and receives wireless signals via the antenna 2310.

As shown in FIG. 15, the wireless communication interface 2325 may include multiple BB processors 2326. For example, the multiple BB processors 2326 may be compatible with multiple frequency bands used by the gNB 2300. As shown in FIG. 15, the wireless communication interface 2325 may include multiple RF circuits 2327. For example, the multiple RF circuits 2327 may be compatible with multiple antenna elements. Although FIG. 15 shows an example in which the wireless communication interface 2325 includes multiple BB processors 2326 and multiple RF circuits 2327, the wireless communication interface 2325 may also include a single BB processor 2326 or a single RF circuit 2327.

In the gNB 2300 shown in FIG. 15, the transceiver device of the wireless communication device on the base station side may be implemented by the wireless communication interface 2325. At least a part of the functions of the processing circuit and/or each unit of the electronic device or the wireless communication device on the base station side may also be implemented by the controller 2321. For example, the controller 2321 may execute at least a part of the functions of the processing circuit and/or each unit of the electronic device or the wireless communication device on the base station side by executing the program stored in the memory 2322.

In the above description of the embodiments of the present disclosure, the features described and/or illustrated for one embodiment may be used in one or more other embodiments in the same or similar manner, combine with features in other embodiments, or substitute the features in other embodiments.

It should be emphasized that the term "comprising/including" as used herein refers to the presence of features, elements, steps or components, but does not exclude the presence or addition of one or more other features, elements, steps or components.

In the above embodiments and examples, reference numerals composed of numbers are used to indicate various steps and/or units. Those skilled in the art should understand that these reference signs are only for convenience of description and drawing, and do not indicate the order or any other limitation.

In addition, the method of the present disclosure is not limited to being executed in the chronological order described in the specification, but may also be executed in other chronological order, in parallel, or independently. Therefore, the execution order of the methods described in this specification does not limit the technical scope of the present disclosure.

Although the present disclosure has been disclosed through the description of specific embodiments of the present disclosure, it should be understood that all the above embodiments and examples are illustrative rather than limiting. Those skilled in the art may make various modifications, improvements, or equivalents to the present disclosure within the spirit and scope of the claims. These modifications, improvements or equivalents should also be considered to be included in the protection scope of the present disclosure.

The invention claimed is:

1. An electronic device for spectrum management, comprising:
   processing circuitry configured to
   generate measurement configuration information that comprises a measurement manner comprising at least one of the following manners: a wireless network management device managed by the electronic device performs measurement, and one or more specific nodes of the wireless network management device perform measurement;
   perform control to transmit the measurement configuration information to one or more wireless network management devices,
   perform control to receive a measurement result from the one or more wireless network management devices, for determining resource allocation to the wireless network management device,
   determine, based on a measurement result related to a plurality of wireless network management devices, a distribution of a statistical result of interferences from a neighboring wireless network on the plurality of wireless network management devices, and determine a type of a topological structure of the plurality of wireless network management devices based on the distribution of the statistical result, the resource allocation being determined based on the determined type of the topological structure.

2. The electronic device according to claim 1, wherein the measurement configuration information further comprises measurement object information comprising:
   information related to a working mode of the wireless network management device; and
   information related to a mode of interference from a neighboring wireless network on the wireless network management device.

3. The electronic device according to claim 2, wherein the information related to the working mode comprises:
   an accumulated working duration of the wireless network management device within a predetermined period of time; and/or
   a distribution of continuous working duration or continuous idle duration of the wireless network management device within a predetermined period of time.

4. The electronic device according to claim 2, wherein the information related to the mode of interference comprises:
   a distribution of interference from the neighboring wireless network on the wireless network management device within a predetermined period of time.

5. The electronic device according to claim 1, wherein the processing circuitry is further configured to:
   generate a topological graph of the plurality of wireless network management devices based on the measurement result, wherein the wireless network management devices correspond to vertexes of the topological graph, interferences between the wireless network management devices correspond to sides of the topological graph.

6. The electronic device according to claim 5, wherein the processing circuitry is configured to determine, as the vertexes of the topological graph, wireless network management devices satisfying the following conditions:
   an accumulated working duration exceeds a preset threshold; and/or
   a ratio of an accumulated working duration to an average continuous working duration exceeds a preset threshold.

7. The electronic device according to claim 6, wherein the processing circuitry is configured to determine the sides of the topological graph based on the following conditions:
   two wireless network management devices connected by the side satisfy a condition of being vertexes of the topological graph; and
   a mean value of signal intensity measured at least one of the two wireless network management devices from the other wireless network management device exceeds a preset threshold.

8. The electronic device according to claim 7, wherein the processing circuitry is further configured to determine a weight of the side by:
   with respect to an undirected graph, determining the weight based on at least one of the following manners: a larger value, a smaller value, a mean value, a weighted sum of mean values of interference intensity in two directions;
   with respect to a directed graph, determining, for each direction, a corresponding weight based on a mean value of interference intensity in the direction.

9. The electronic device according to claim 8, wherein the processing circuitry is configured to determine a type of a topological structure based on weighted degree of the vertexes of the topological graph, wherein the weighted degree is a sum of weights of sides connected to a corresponding vertex.

10. The electronic device according to claim 1, wherein the processing circuitry is further configured to:
    determine, based on the determined type of the topological structure and a type of a vertex, a manner of resource re-allocation caused by a change in a wireless network management device corresponding to the vertex.

11. The electronic device according to claim 10, wherein the type of the topological structure comprises a random network and a scale-free network, and the manner of resource re-allocation comprises:
    with respect to the random network, attempting for a local modification to perform resource allocation; and
    with respect to the scale-free network, based on an influence degree produced by a vertex in a topological network, re-performing resource allocation for a whole structure with respect to topological change caused by a vertex with greater influence degree, and attempting for a local modification to perform resource allocation with respect to topological change caused by a vertex with smaller influence degree.

12. The electronic device according to claim 1, wherein the electronic device is configured on a side of a Spectrum Access System SAS or Co-existence Manager CxM, and the wireless network management device comprises a Citizens Broadband Radio Service Device CBSD.

13. The electronic device according to claim 1, wherein the electronic device is configured on a side of a C3 Instance, and the wireless network management device comprises a Wireless Access System WAS or a Radio Local Area Network RLAN.

14. A spectrum management method, comprising:
    generating measurement configuration information that comprises a measurement manner comprising at least one of the following manners: a wireless network management device managed by the electronic device performs measurement, and one or more specific nodes of the wireless network management device perform measurement;
    transmitting the measurement configuration information to one or more wireless network management devices;
    receiving a measurement result from the one or more wireless network management devices, for determining resource allocation to the wireless network management device;
    determining, based on a measurement result related to a plurality of wireless network management devices, a distribution of a statistical result of interferences from a neighboring wireless network on the plurality of wireless network management devices; and
    determining a type of a topological structure of the plurality of wireless network management devices based on the distribution of the statistical result, the resource allocation being determined based on the determined type of the topological structure.

* * * * *